(12) United States Patent
Tezuka et al.

(10) Patent No.: US 7,523,059 B2
(45) Date of Patent: Apr. 21, 2009

(54) CALCULATING FINANCIAL RISK OF A PORTFOLIO USING DISTRIBUTED COMPUTING

(75) Inventors: Shu Tezuka, Chigasaki (JP); Hiroki Murata, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1052 days.

(21) Appl. No.: 10/890,736

(22) Filed: Jul. 14, 2004

(65) Prior Publication Data

US 2005/0021438 A1 Jan. 27, 2005

(30) Foreign Application Priority Data

Jul. 24, 2003 (JP) .............................. 2003-278842

(51) Int. Cl.
  G06Q 40/00 (2006.01)
  G06F 15/16 (2006.01)
(52) U.S. Cl. ..................................... 705/36 R; 709/209
(58) Field of Classification Search ................. 709/201; 705/35–36 R, 1
  See application file for complete search history.

(56) References Cited

U.S. PATENT DOCUMENTS

2001/0044844 A1* 11/2001 Takei .......................... 709/224
2003/0005068 A1* 1/2003 Nickel et al. ................ 709/208
2004/0103095 A1* 5/2004 Matsugu et al. ................ 707/6
2004/0107450 A1* 6/2004 Kodama ...................... 725/135

FOREIGN PATENT DOCUMENTS

WO    WO02/054224    7/2002

OTHER PUBLICATIONS

Ioannidis, Ioannis, et al., "A Secure Protocol for Computing Dot-Products in Clustered and Distributed Environments", Proceedings of the International Conference on Parallel Processing, (ICPP'02), IEEE.
Ben-Or et al. "Completeness Theorems for Non-Cryptographic Fault-Tolerant Distributed Computation," 1988, pp. 1-10.

* cited by examiner

Primary Examiner—Bunjob Jaroenchonwanit
Assistant Examiner—Joe Chacko
(74) Attorney, Agent, or Firm—Scully, Scott, Murphy & Presser, P.C.; Lisa M. Yamonaco, Esq.

(57) ABSTRACT

Protects a highly confidential parameter against leakage in a distributed computing system. An example distributed computing system causing a plurality of partial calculations to be performed includes parameter storage for storing a parameter set having a plurality of parameters, conversion means for converting a linear parameter, sending means for sending each of converted parameter sets in association with parameter identifying information for identifying the parameter set to cause each of a plurality of calculation processing devices to perform each of a plurality of partial calculations, conversion ratio storage means for storing a conversion ratio of a parameter, conversion ratio searching means for searching for a conversion ratio corresponding to a parameter identifying information, and inversion outputting means for generating a partial calculation result by multiplying a calculation result by an inverse number of the conversion ratio and for outputting a set of the partial calculation results.

1 Claim, 8 Drawing Sheets

[Figure 1]
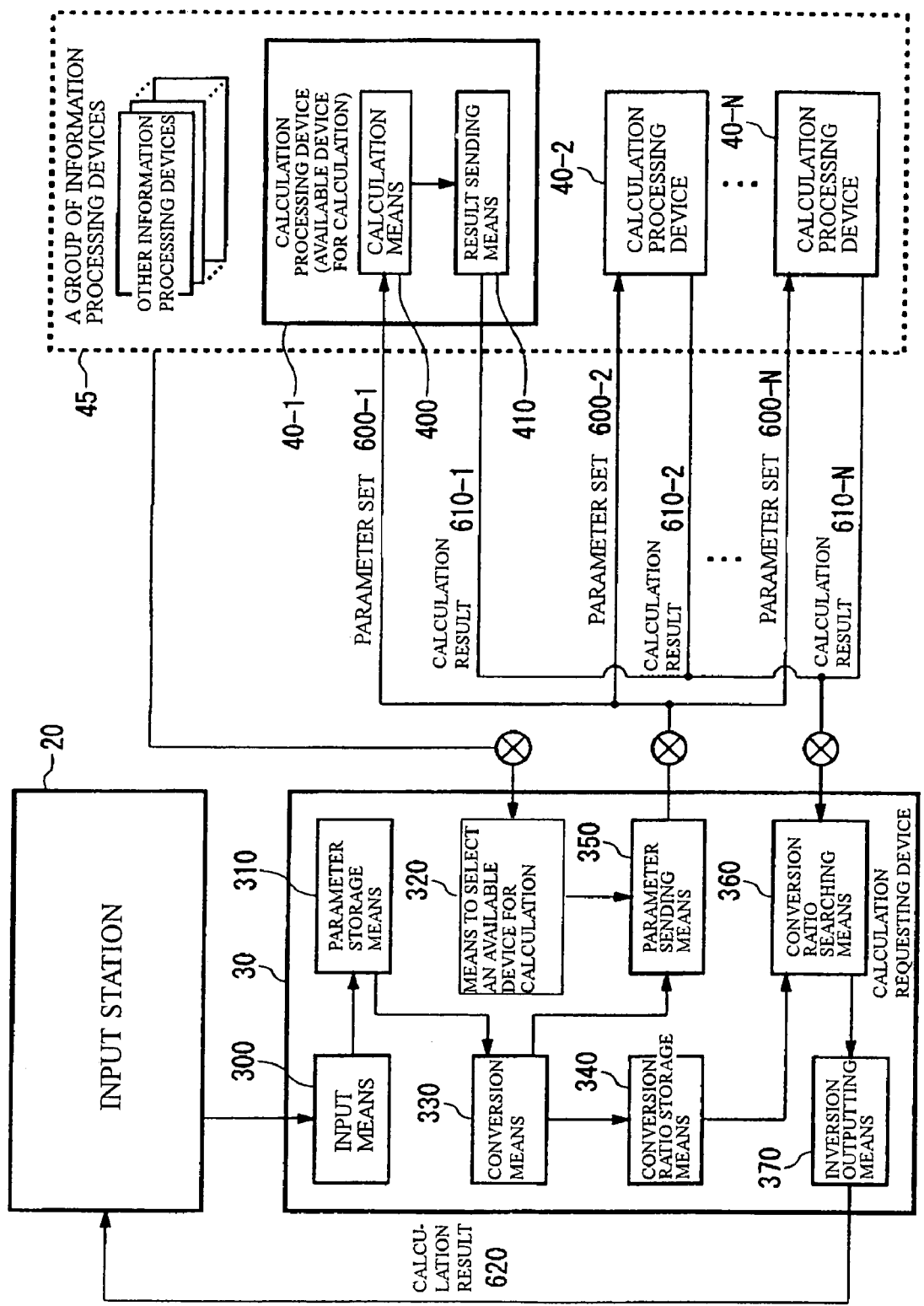

| PARAMETER IDENTIFYING INFORMATION | INITIAL VALUE OF RANDOM NUMBERS | FINANCIAL ASSET INFORMATION | | | | CORRELATION INFORMATION | | | | | |
|---|---|---|---|---|---|---|---|---|---|---|---|
| | | ASSET IDENTIFYING INFORMATION | RATING | VALUE | MATURITY DATE | 1 | 2 | 3 | 4 | 5 | |
| 1 | 6524125 | 1 | AAA | 7,000,000 | 3 | 1 | 0.45 | 0.45 | 0.45 | 0.15 | |
| | | 2 | A | 1,000,000 | 4 | 0.45 | 1 | 0.45 | 0.45 | 0.15 | |
| | | 3 | A | 1,000,000 | 1 | 0.45 | 0.45 | 1 | 0.45 | 0.15 | |
| | | 4 | BBB | 3,000,000 | 2 | 0.45 | 0.45 | 0.45 | 1 | 0.15 | |
| | | 5 | CCC | 10,000,000 | 3 | 0.15 | 0.15 | 0.15 | 0.15 | 1 | |
| 2 | 3456543 | 1 | AAA | 7,000,000 | 3 | 1 | 0.45 | 0.45 | 0.45 | 0.15 | |
| | | 2 | A | 1,000,000 | 4 | 0.45 | 1 | 0.45 | 0.45 | 0.15 | |
| | | 3 | A | 1,000,000 | 1 | 0.45 | 0.45 | 1 | 0.45 | 0.15 | |
| | | 4 | BBB | 3,000,000 | 2 | 0.45 | 0.45 | 0.45 | 1 | 0.15 | |
| | | 5 | CCC | 10,000,000 | 3 | 0.15 | 0.15 | 0.15 | 0.15 | 1 | |
| ... | ... | ... | | | | ... | | | | | |

| PARAMETER IDENTIFYING INFORMATION | INITIAL VALUE OF RANDOM NUMBERS | FINANCIAL ASSET INFORMATION | | | | CORRELATION INFORMATION | | | | |
|---|---|---|---|---|---|---|---|---|---|---|
| | | ASSET IDENTIFYING INFORMATION | RATING | VALUE | MATURITY DATE | 1 | 2 | 3 | 4 | 5 |
| 1 | 6524125 | 1 | AAA | 1 | 3 | 1 | 0.45 | 0.45 | 0.45 | 0.15 |
| | | 2 | A | 1 | 4 | 0.45 | 1 | 0.45 | 0.45 | 0.15 |
| | | 3 | A | 1 | 1 | 0.45 | 0.45 | 1 | 0.45 | 0.15 |
| | | 4 | BBB | 1 | 2 | 0.45 | 0.45 | 0.45 | 1 | 0.15 |
| | | 5 | CCC | 1 | 3 | 0.15 | 0.15 | 0.15 | 0.15 | 1 |

| PARAMETER IDENTIFYING INFORMATION | ASSET IDENTIFYING INFORMATION | CONVERSION RATIO |
|---|---|---|
| 1 | 1 | $\frac{1}{7000000}$ |
| | 2 | $\frac{1}{1000000}$ |
| | 3 | $\frac{1}{1000000}$ |
| | 4 | $\frac{1}{3000000}$ |
| | 5 | $\frac{1}{10000000}$ |
| 2 | ⋮ | ⋮ |

| PARAMETER IDENTIFYING INFORMATION | FINANCIAL ASSET INFORMATION | | | |
|---|---|---|---|---|
| | ASSET IDENTIFYING INFORMATION | RATING | PREDICTED VALUE FOR FUTURE VALUE | MATURITY DATE |
| 1 | 1 | AAA | 1.117292 | 3 |
| | 2 | A | 1.177268 | 4 |
| | 3 | A | 1.222345 | 1 |
| | 4 | BBB | 1.060415 | 2 |
| | 5 | CCC | 1.422907 | 3 |

| FINANCIAL ASSET INFORMATION | | | |
|---|---|---|---|
| ASSET IDENTIFYING INFORMATION | RATING | PREDICTED VALUE FOR FUTURE VALUE | MATURITY DATE |
| 1 | AAA | 7,821,044 | 3 |
| 2 | A | 1,177,268 | 4 |
| 3 | A | 1,222,345 | 1 |
| 4 | BBB | 3,181,245 | 2 |
| 5 | CCC | 14,229,070 | 3 |

[Figure 7]
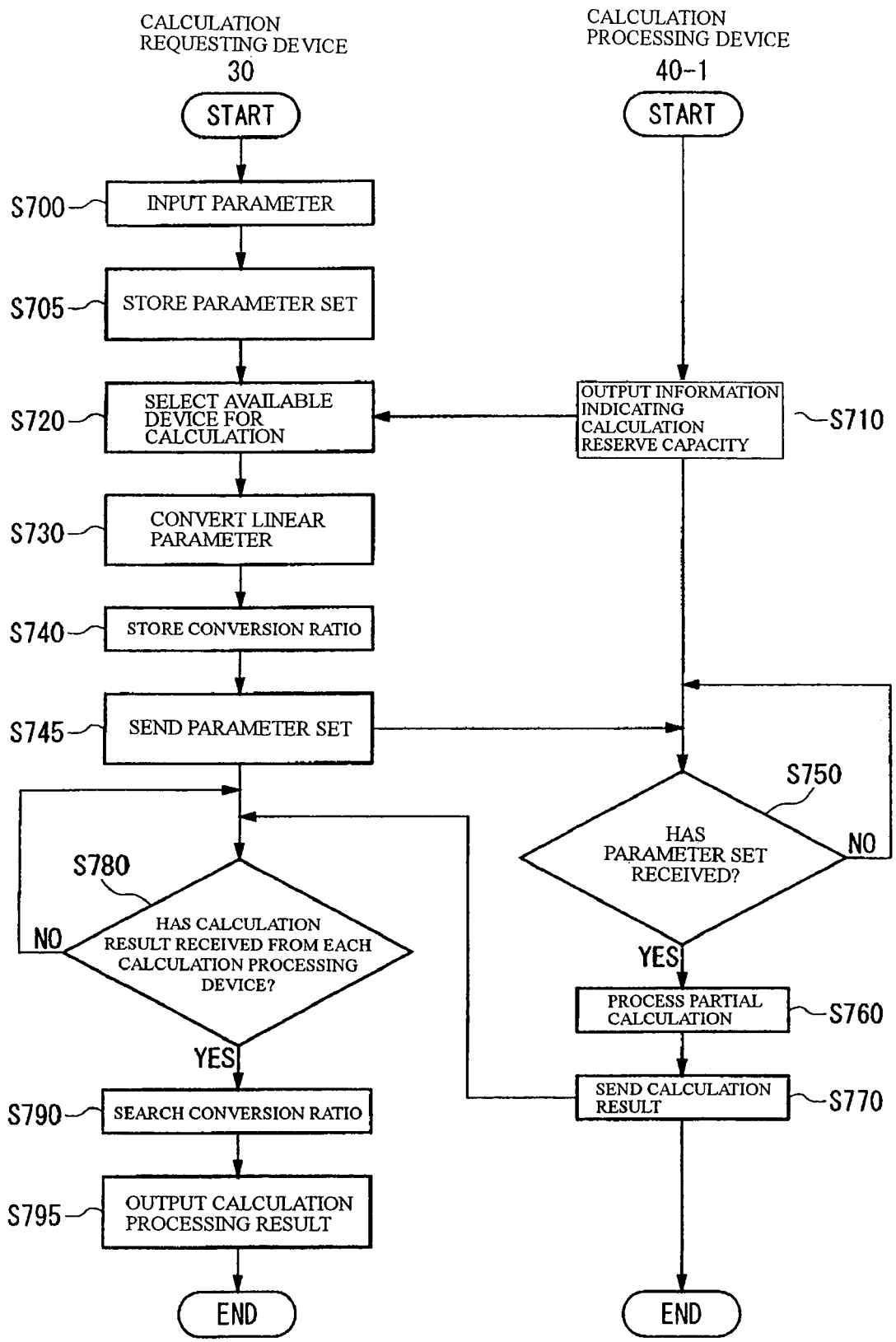

| PARAMETER IDENTIFYING INFORMATION | INITIAL VALUE OF RANDOM NUMBERS | FINANCIAL ASSET INFORMATION | | | |
|---|---|---|---|---|---|
| | | ASSET IDENTIFYING INFORMATION | RATING | VALUE | MATURI-TY DATE |
| 1 | 6524125 | 1 | AAA | 4,000,000 | 3 |
| | | 2 | A | 2,000,000 | 4 |
| | | 3 | A | 3,000,000 | 1 |
| | | 4 | BBB | 2,000,000 | 2 |
| | | 5 | CCC | 11,000,000 | 3 |

(b)

600-2

| PARAMETER IDENTIFYING INFORMATION | INITIAL VALUE OF RANDOM NUMBERS | FINANCIAL ASSET INFORMATION | | | |
|---|---|---|---|---|---|
| | | ASSET IDENTIFYING INFORMATION | RATING | VALUE | MATURI-TY DATE |
| 2 | 3456543 | 1 | AAA | 5,000,000 | 3 |
| | | 2 | A | 2,000,000 | 4 |
| | | 3 | A | 2,000,000 | 1 |
| | | 4 | BBB | 1,000,000 | 2 |
| | | 5 | CCC | 12,000,000 | 3 |

[Figure 9]
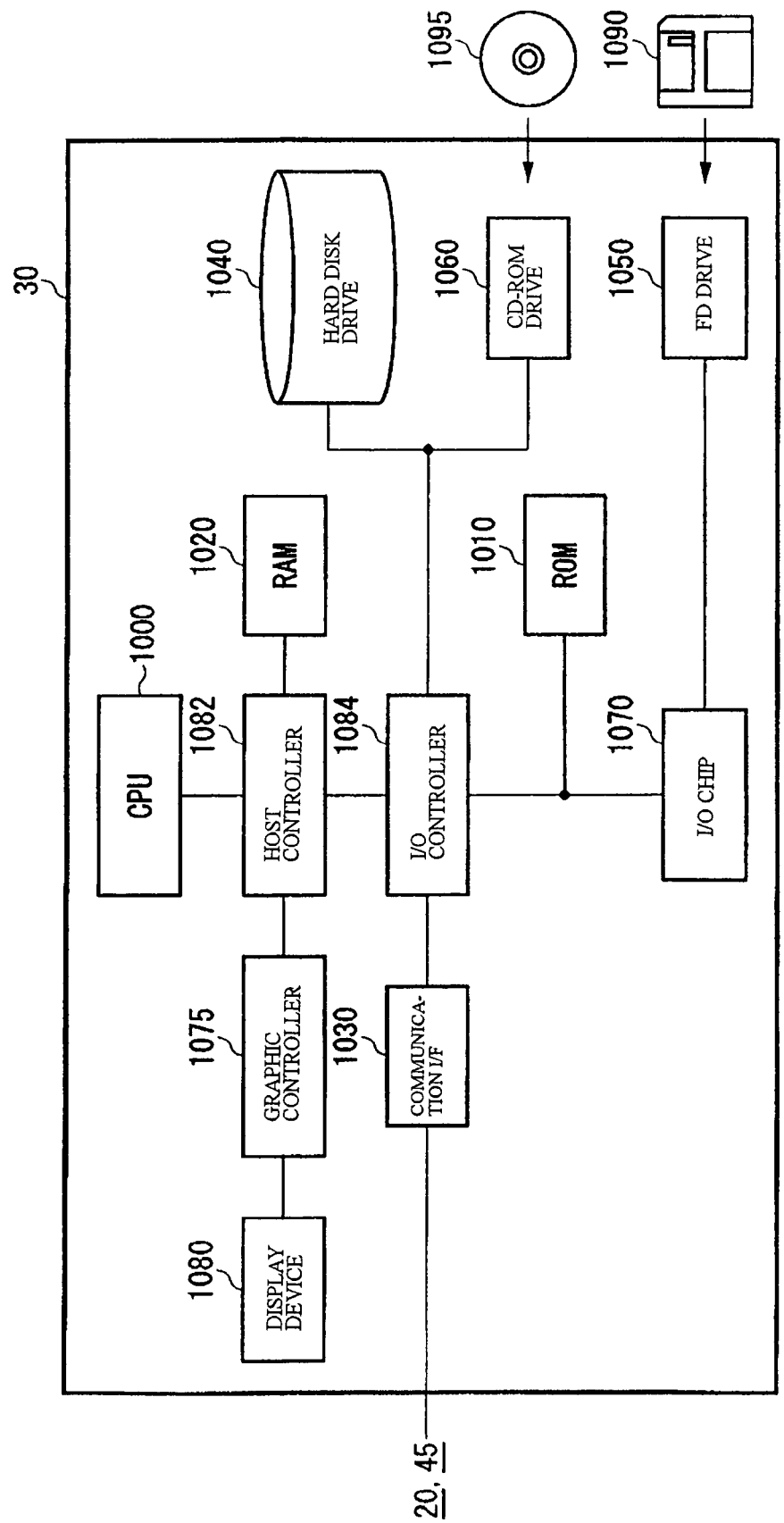

CALCULATING FINANCIAL RISK OF A PORTFOLIO USING DISTRIBUTED COMPUTING

FIELD OF THE INVENTION

The present invention relates to a distributed computing system. More specifically, the present invention relates to a distributed computing system performing a calculation on the basis of a highly confidential parameter.

BACKGROUND

With recent developments of a networking technology, a grid computing technology for performing a calculation, which requires a huge calculation resource, using an unspecified number of computers in parallel (see Non-Patent Document 1) is now drawing attention. For example, this grid computing technology is effectively applied to the field of science and technology calculation such as clarification of gene information.

Consider, M. Ben-Or, S. Goldwasser, and A. Wigderson. Completeness theorems for non-cryptographic fault-tolerant distributed computation. In Proceedings of the 20th Annual ACM Symposium on Theory of Computing, STOC'88, pages 1-10, Chicago, Ill. USA, May 2-4, 1988. ACM.

However, with the grid computing technology, a device requesting calculation has to send a parameter necessary for the calculation to an unspecified number of computers. This allows an administrator or the like of a computer handling the calculation to read out the parameter. And this also allows one to read out the parameter by intercepting the communication line. This is why the grid computing technology cannot be applied to highly confidential calculation such as calculation of a financial risk for an inventor.

A secret calculation technology for keeping a calculation result confidential by performing a necessary calculation along with an unnecessary calculation and using only the result of the necessary calculation has been used. However, this technology cannot keep a parameter confidential nor effectively use a calculation resource due to the unnecessary calculation.

SUMMARY OF THE INVENTION

Therefore, the present invention provides a distributed computing system that can solve the above-mentioned problems. In an example embodiment, the present invention provides a distributed computing system, a method and a program for controlling the same, and a recording medium recording the same program; wherein the distributed computing system is the distributed computing system comprising a plurality of calculation processing devices, each performing a plurality of partial calculations forming predetermined calculation processing, and a calculation requesting device for requesting a partial calculation from the plurality of calculation processing devices, wherein the calculation requesting device comprises a parameter storage means for storing a plurality of parameter sets, each having a plurality of parameters including at least one parameter different from the parameters of the other sets; a conversion means for converting a linear parameter, which is linear to a partial calculation result obtained by using the parameter set, among a plurality of parameters in the parameter set into a conversion parameter to hide the linear parameter from the plurality of calculation processing devices for each of the plurality of parameter sets; a sending means for sending each of the parameter sets converted by the conversion means to each of the plurality of calculation processing devices in association with parameter identifying information for identifying the parameter set; and a conversion ratio storage means for storing a conversion ratio, which is a ratio of the conversion parameter to the linear parameter, in association with parameter identifying information for identifying the parameter set for each of the plurality of parameter sets, wherein each of the plurality of calculation processing devices comprises a calculation means for performing a partial calculation in parallel with the other calculation processing devices on the basis of a parameter set obtained from the calculation requesting device; and a result sending means for sending the calculation result from the calculation means to the calculation requesting device in association with the parameter identifying information for identifying the parameter set, and wherein the calculation requesting device further comprises a conversion ratio searching means for searching the conversion ratio storage means for a conversion ratio corresponding to the parameter identifying information received from the calculation processing device and for obtaining the ratio from the means for each of the plurality of calculation processing devices; and an inversion outputting means for generating a partial calculation result by multiplying the calculation result received from each of the plurality of calculation processing devices by an inverse number of the conversion ratio corresponding to the parameter identifying information received from the calculation processing device and for outputting a set of results of the partial calculations in the plurality of calculation processing devices as a result of the calculation processing.

BRIEF DESCRIPTION OF THE DRAWINGS

These, and further, aspects, advantages, and features of the invention will be more apparent from the following detailed description of a preferred embodiment and the appended drawings wherein:

FIG. 1 is a functional block diagram of distributed computing system 10;

FIG. 2 is an example of information stored in parameter storage means 310;

FIG. 3 is an exemplary content of a parameter set 600-1 that is sent from parameter sending means 350 to calculation processing device 40-1;

FIG. 4 is an example of information to be stored in conversion ratio storage means 340;

FIG. 5 is an exemplary content of calculation result 610-1 to be sent from calculation processing device 40-1 to calculation requesting device 30;

FIG. 6 an exemplary content of calculation result 620;

FIG. 7 is an exemplary action flow of a distributed computing system 10;

FIG. 8(a) is an exemplary content of parameter set 600-1 according to a modification;

FIG. 8(b) is an exemplary content of parameter set 600-2 according to a modification; and FIG. 9 is an exemplary hardware configuration of calculation requesting device 30.

DESCRIPTION OF SYMBOLS

10 . . . Distributed computing system
20 . . . Input station
30 . . . Calculation requesting device
40 . . . A group of calculation processing devices
45 . . . A group of information processing devices
300 . . . Input means 310 . . . Parameter storage means
320 . . . Means to select an available device for calculation
330 . . . Conversion means
340 . . . Conversion ratio storage means
350 . . . Parameter sending means
360 . . . Conversion ratio searching means
370 . . . Inversion outputting means
400 . . . Calculation means
410 . . . Result sending means
600 . . . Parameter set
610 . . . Calculation result
620 . . . Calculation result

DETAILED DESCRIPTION OF THE INVENTION

The present invention provides systems, apparatus and methods wherein a highly confidential parameter can be protected against leakage in a distributed computing system. In contradistinction, with grid computing technology, a device requesting calculation has to send a parameter necessary for the calculation to an unspecified number of computers. This allows an administrator or the like of a computer handling the calculation to read out the parameter. And this also allows one to read out the parameter by intercepting the communication line. This is why the grid computing technology cannot be applied to highly confidential calculation such as calculation of a financial risk for an inventor.

A secret calculation technology for keeping a calculation result confidential by performing a necessary calculation along with an unnecessary calculation and using only the result of the necessary calculation has been used. However, this technology cannot keep a parameter confidential nor effectively use a calculation resource due to the unnecessary calculation.

The present invention provides a distributed computing system that can solve the above-mentioned problems.

In an example embodiment, the present invention provides a distributed computing system, a method and a program for controlling the same, and a recording medium recording the same program. A distributed computing system comprises a plurality of calculation processing devices, each performing a plurality of partial calculations forming predetermined calculation processing, and a calculation requesting device for requesting a partial calculation from the plurality of calculation processing devices, wherein the calculation requesting device comprises a parameter storage means for storing a plurality of parameter sets, each having a plurality of parameters including at least one parameter different from the parameters of the other sets; a conversion means for converting a linear parameter, which is linear to a partial calculation result obtained by using the parameter set, among a plurality of parameters in the parameter set into a conversion parameter to hide the linear parameter from the plurality of calculation processing devices for each of the plurality of parameter sets; a sending means for sending each of the parameter sets converted by the conversion means to each of the plurality of calculation processing devices in association with parameter identifying information for identifying the parameter set; and a conversion ratio storage means for storing a conversion ratio, which is a ratio of the conversion parameter to the linear parameter, in association with parameter identifying information for identifying the parameter set for each of the plurality of parameter sets, wherein each of the plurality of calculation processing devices comprises a calculation means for performing a partial calculation in parallel with the other calculation processing devices on the basis of a parameter set obtained from the calculation requesting device; and a result sending means for sending the calculation result from the calculation means to the calculation requesting device in association with the parameter identifying information for identifying the parameter set, and wherein the calculation requesting device further comprises a conversion ratio searching means for searching the conversion ratio storage means for a conversion ratio corresponding to the parameter identifying information received from the calculation processing device and for obtaining the ratio from the means for each of the plurality of calculation processing devices; and an inversion outputting means for generating a partial calculation result by multiplying the calculation result received from each of the plurality of calculation processing devices by an inverse number of the conversion ratio corresponding to the parameter identifying information received from the calculation processing device and for outputting a set of results of the partial calculations in the plurality of calculation processing devices as a result of the calculation processing.

Although, the description of the present invention does not cover all the essential characteristics of the present invention. The sub-combination of these characteristics can fall into the scope of the present invention.

Now, the present invention will be described in conjunction with particular example embodiments thereof. The embodiments below do not limit the present invention to the appended Claim and all combinations of characteristics described in the embodiments are not necessary for a solution of the present invention.

FIG. 1 is a functional block diagram of distributed computing system 10. Distributed computing system 10 performs calculation processing for calculating a financial risk of the portfolio. This includes, for example, a predicted value for a future value with calculation processing devices 40-1~N for the portfolio that includes a plurality of financial assets.

Distributed computing system 10 is a calculation service system performing a calculation processing service in response to an input by a user on input station 20. Distributed computing system 10 includes input station 20, calculation requesting device 30, and a group of information processing devices 45 including a plurality of information processing devices, each connected with calculation requesting device 30 via a telecommunication line. Input station 20 sends an input parameter received from a user to calculation requesting device 30. Calculation requesting device 30 selects devices meeting a certain condition from a group of information processing devices 45 as calculation processing devices 40-1~N. Calculation requesting device 30 converts pieces of information, each of which indicates a value of a financial asset in a plurality of parameters used for calculation processing of the financial risk, into convert parameters in order to hide the pieces of information from the other devices and the like and sends the converted parameters to calculation processing devices 40-1~N.

Each of calculation processing devices 40-1~N performs each of a plurality of partial calculations forming the calculation processing in parallel with the other devices and sends the calculation result to calculation requesting device 30. In response, calculation requesting device 30 generates a desired result by multiplying the partial calculation result by a value of a financial asset and an inverse number of a conversion ratio of a conversion parameter. Calculation requesting device 30 calculates a financial risk or the like by using a set of calculation results of partial calculations and outputs it to input station 20. In this manner, distributed computing system 10 performs calculation processing quickly and properly with calculation processing devices 40-1~N, while hiding highly confidential information from an interceptor of the communication line and an administrator of each of calculation processing devices 40-1~N. In this manner, calculation processing of even a highly confidential financial risk and the like can be performed by a plurality of information processing devices in Internet or Intranet that is not sufficiently protected against data leakage.

Calculation requesting device 30 is a device requesting each of calculation processing devices 40-1~N to perform a partial calculation, including input means 300, parameter storage means 310, means to select an available device for calculation 320, conversion means 330, conversion ratio storage means 340, parameter sending means 350, conversion ratio searching means 360, and inversion outputting means 370. Input means 300 allows a user to input an input parameter, which is at least a parameter including a linear parameter linear to a partial calculation result obtained by using the parameter set in the parameter set including a plurality of parameters by means of input station 20 and sends the input parameter to parameter storage means 310.

Linear parameter is information indicating a value of a finance asset, for example. As described below, a value of a financial asset is linear to a predicted value for a future value of a financial asset that is a partial calculation result.

a predicted value for a future value=a value determined by a parameter other than the amount of money×a value of a financial asset A linear parameter is not limited to a value of a financial asset in the embodiment and it may be any parameter linear to a partial calculation result.

Parameter storage means 310 stores a plurality of parameter sets, each having a plurality of parameters including at least one parameter different from the parameters of the other sets. For example, parameter storage means 310 stores a set of an input parameter input by a user with input means 300 and predetermined other parameters as a parameter set in association with parameter identifying information identifying the parameter.

Means to select an available device for calculation 320 selects a plurality of devices with calculation reserve capacity, each is an information processing device whose ratio of calculation throughput to be performed in a certain unit time to the maximum calculation throughput, which can be processed in a unit time, is lower than a predetermined standard ratio as a calculation processing device to perform a partial calculation. means to select an available device for calculation 320 sends information identifying selected calculation processing devices 40-1~N to parameter sending means 350.

Conversion means 330 convert a linear parameter linear to a partial calculation result obtained by using the parameter set in a plurality of parameters in the parameter set into a conversion parameter in order to hide the linear parameter from calculation processing devices 40-1~N for each of the plurality of parameter sets stored in parameter storage means 310 and sends a parameter set including the conversion parameter to parameter sending means 350 in association with parameter identifying information. Conversion means 330 sends a linear parameter before conversion and a conversion parameter after conversion to conversion ratio storage means 340 in association with parameter identifying information.

Conversion ratio storage means 340 calculates a conversion ratio, which is the ratio of a conversion parameter to a linear parameter for each of a plurality of parameter sets on the basis of a linear parameter and a conversion parameter received from conversion means 330 and stores the conversion ratio in association with the parameter identifying information received from conversion means 330.

Parameter sending means 350 sends each of parameter sets converted by conversion means 330 to each of calculation processing devices 40-1~N in association with parameter identifying information identifying the parameter set. In this manner, parameter sending means 350 makes each of a plurality of partial calculations to be performed in each of calculation processing devices 40-1~N.

Conversion ratio searching means 360 receives each of calculation results 610-1~N, which is a calculation result in each of a plurality of partial calculations, from each of calculation processing devices 40-1~N in association with parameter identifying information identifying a parameter set used in the partial calculation and sends it to inversion outputting means 370. Conversion ratio searching means 360 searches conversion ratio storage means 340 for a conversion ratio corresponding to parameter identifying information received from the calculation processing device and obtains the ratio from the means for each of calculation processing devices 40-1~N and sends the ratio to inversion outputting means 370.

Inversion outputting means 370 receives calculation results 610-1~N from calculation processing devices 40-1~N via conversion ratio searching means 360. Inversion outputting means 370 receives a conversion ratio associated with parameter identifying information from conversion ratio storage means 340. Inversion outputting means 370 generates a partial calculation result by multiplying each of calculation results 610-1~N received from calculation processing devices 40-1~N by an inverse number of a conversion ratio corresponding to parameter identifying information received from calculation processing devices 40-1~N. Then, inversion outputting means 370 outputs a set of the generated partial calculation results as calculation result 620 to a user of input station 20.

Calculation processing device 40-1 has calculation means 400 and result sending means 410. Calculation means 400 performs a partial calculation in parallel with the other calculation processing devices, such as calculation processing devices 40-1~N on the basis of parameter set 600-1 received from calculation requesting device 30 and sends the calculation result to result sending means 410. Result sending means 410 sends calculation result 610-1 of a partial calculation obtained by calculation means 400 to calculation requesting device 30 in association with parameter identifying information that identifies parameter set 600-1. Each of calculation processing devices 40-2~N is just about the same as calculation processing device 40-1, except for calculating calculation results 610-2~N based on each of parameter sets 600-2~N. Thus, description about the calculation processing devices 40-2~N will be omitted.

In this manner, distributed computing system 10 converts a linear parameter linear to a result of the partial calculation in a conversion parameter set required for a partial calculation into a conversion parameter. Even if communication among calculation requesting device 30 and calculation processing devices 40-1~N is intercepted or an administrator or the like of calculation processing devices 40-1~N wrongly reads out a linear parameter, detailed contents of the linear parameter can be protected against leakage.

In the embodiment, calculation requesting device 30 is a server device that provides distributed computing in response to an indication from input station 20. Calculation requesting device 30 may be a client device that is integrated with input station 20, instead. In this case, calculation requesting device 30 converts a linear parameter input by a user into a conversion parameter and sends the conversion parameter to calculation processing devices 40-1~N for partial calculations. In this manner, the user can hide the highly confidential linear parameter from a server device as well as calculation from the other processing devices.

FIG. 2 is an example of a parameter set stored in parameter storage means 310. Parameter storage means 310 stores each of a plurality of parameter sets in association with parameter identifying information that identifies the parameter set. For example, parameter storage means 310 stores financial asset information indicating a value and the like of the financial asset in each of a plurality of different financial assets forming a portfolio, correlation information indicating a correlation of price fluctuation among the plurality of financial assets and the initial value of random numbers as a parameter set.

An initial value of random numbers is a value for defining an occurrence order of values occurring as random numbers in the random numbers used for calculating a predicted value for a future value for a financial asset. An initial value of random numbers may also be a sequence showing at least a part of values occurred as random numbers. In other words, an initial value of random numbers is not limited to a single value. The initial value may be any information defining an occurrence order of random numbers. Correlation information is information indicating how price fluctuation in each of a plurality of financial assets correlated with price fluctuation of the other financial assets, for example. For example, correlation information is a correlation matrix in a matrix data structure.

Parameter storage means 310 stores assets identifying information for identifying the financial asset, rating information showing a rating of the financial asset, a value of the financial asset, and the maturity date of the financial asset as financial asset information for each financial asset included in a portfolio. A financial asset is a credit intended for cash repayment in contrast to a real asset, and it may be savings, a loan, a bond, a stock, a trust, or insurance. Rating information is information indicating the likelihood of a repayment and a dividend of a financial asset evaluated by a rating agency. Rating information may be a rating of a document of value, an example of a financial asset, or may be a rating of an issuer of a document of value, an example of a financial asset. A value of a financial asset is an example of a linear parameter, and a sum of face values of the financial assets in a portfolio, for example. A value of a financial asset may be a sum of present prices (actual values) of the financial assets, or a sum of call prices of the financial assets.

Parameter storage means 310 stores 6524125, an initial value of random numbers, financial asset information on a financial asset whose asset identification information is between 1 and 5, and correlation information as a parameter set whose parameter identifying information is 1. Parameter storage means 310 stores 3456543, an initial value of random numbers, financial asset information on a financial asset whose asset identifying information is between 1 and 5, and correlation information as a parameter set whose parameter identifying information is 2. In this manner, parameter storage means 310 stores a plurality of parameter sets, each has at least a different initial value of random numbers.

Calculation requesting device 30 sends parameter sets shown in FIG. 2 to calculation processing devices 40-1~N so that predicted values for future values are obtained for a plurality of financial assets. As correlation is defined for price fluctuation among a plurality of financial assets, calculation requesting device 30 cannot send a parameter set for each of financial assets one by one. Calculation requesting device 30 has to send financial asset information with respect to the whole of a plurality of financial assets that form a portfolio. However, if calculation requesting device 30 sends the whole of a plurality of financial assets that form a portfolio as they are, highly confidential information such as the number of financial assets can be leaked to a third party by interception of a communication line. Then an owner of the portfolio, for example an investor, may expose information on a management risk of the investor, such as whether the investor holds a great deal of low-rated financial assets, to a third party. Hence, calculation requesting device 30 must hide highly confidential information such as the number of financial assets.

FIG. 3 is an exemplary content of a parameter set 600-1 that is sent from parameter sending means 350 to calculation processing device 40-1. Conversion means 330 converts a value of a financial asset in a form of a linear parameter into a conversion parameter that indicates a certain number so as to hide the value of the financial asset from calculation processing device 40-1. For example, in FIG. 3, conversion means 330 converts a value of the financial asset in a form of a linear parameter into a conversion parameter for each of financial assets whose asset identification information is between 1 and 5. In response, parameter sending means 350 sends parameter set 600-1 including the conversion parameter to calculation processing device 40-1.

In the example of FIG. 3, conversion means 330 converts a value of a financial asset in a form of a linear parameter into a conversion parameter that is the amount of a trading unit of a currency indicating the value of the financial asset, for example 1 yen. Conversion means 330 may convert a value of a financial asset in a form of a linear parameter into the amount of trading unit of the financial asset, for example, 100 yen, the face value of a bond when the financial asset is a bond, or 50 yen, 500 yen, or 5000 yen, the face value of a stock when the financial asset is a stock.

Each of parameter sets 600-2~N can be just about the same as parameter set 600-1, except that each has different initial value of random numbers from parameter set 600-1. For example, conversion means 330 may convert a linear parameter indicating a value of a financial asset into a conversion parameter of 1, also in a parameter set shown in FIG. 2 whose parameter identifying information is 2. In this manner, conversion means 330 may convert a linear parameter of the parameter set into a conversion parameter, which is a value predefined to the same value (e.g., 1 yen), regardless of a destination of the parameter in each of a plurality of parameter sets.

FIG. 4 is an example of information to be stored in conversion ratio storage means 340. Conversion ratio storage means 340 stores a conversion ratio, which is a ratio of a conversion parameter to a linear parameter in association with parameter identifying information for identifying the parameter set and financial asset information for identifying a financial asset, for each of a plurality of parameter sets.

For example, as parameter sending means 350 converts a value of a financial asset, 7,000,000 whose financial asset information is 1 to a conversion parameter of 1, conversion ratio storage means 340 stores 1/7000000 as a conversion ratio. In the example shown in FIG. 4, conversion ratio storage means 340 stores the number of a conversion parameter divided by a linear parameter as a conversion ratio, the ratio of a conversion parameter to a linear parameter. Conversion ratio storage means 340 may store the number of a linear parameter divided by a conversion parameter as a conversion ratio. In other words, a conversion ratio stored in conversion ratio storage means 340 may be any ratio that indicates a ratio of a linear parameter or a conversion parameter.

FIG. 5 is an exemplary content of calculation result 610-1 to be sent from calculation processing device 40-1 to calculation requesting device 30. Calculation means 400 calculates a predicted value for a future value for a certain value of a financial asset, for example 1 yen, on the basis of financial assets information, as a partial calculation performed in parallel with the other calculation processing devices. For example, calculation means 400 calculates 1.117292 yen as a predicted value for a future value for a financial asset whose financial asset information is 1 yen. Then result sending means 410 sends calculation result 610-1 including a predicted value for a future value to calculation requesting device 30.

Each of calculation processing devices 40-2~N calculates each of calculation results 610-2~N indicating an initial value of a future value that is different from calculation result 610-1 by performing a partial calculation with an initial value of random numbers that is different from the initial value used in calculation processing device 40-1, and sends each of the calculation results to calculation requesting device 30.

FIG. 6 is an exemplary content of calculation result 620. Conversion ratio searching means 360 searches conversion ratio storage means 340 for a conversion ratio corresponding to parameter identifying information received from the calculation processing device and obtains the ratio from the means for each of calculation processing devices 40-1~N. Then inversion outputting means 370 generates calculation result 620, which is a predicted value for a future value on the basis of a value of the actual financial asset in a portfolio by multiplying a predicted value for a future value in calculation result 610-1 received from calculation processing device 40-1 by an inverse number of a conversion ratio corresponding to parameter identifying information received from calculation processing device 40-1, and outputs the calculation result 620 to input station 20.

Specifically, conversion ratio searching means 360 searches conversion ratio searching means 360 for 1/7000000, 1/1000000, 1/1000000, 1/3000000, and 1/10000000, conversion ratios corresponding to the parameter identifying information on based on 1 of the parameter identifying information in calculation result 610-1, and obtains these conversion ratios from the means. Then inversion outputting means 370 generates 7,821,044, 1,177,268, 1,222,345, 3,181,245, and 14,229,070, the predicted values for future values by multiplying 1.117292, 1.177268, 1.222345, 1.060415, and 1.422907, the predicted values for future values for respective financial assets of calculation result 610-1 by respective inverse numbers of the conversion ratios.

In the same manner, inversion outputting means 370 generates calculation result 620, which is a predicted value for a future value on the basis of a value of the actual financial asset in a portfolio, for each initial value of random numbers, by multiplying a predicted value for a future value for each of calculation results 610-2~N received from each of calculation processing devices 40-2~N by an inverse number of a conversion ratio corresponding to parameter identifying information received from each of calculation processing devices 40-2~N.

In this manner, distributed computer system 10 can generate a predicted value for a future value on the basis of a value of the actual financial asset in a portfolio, while hiding a value of a financial asset and a predicted value for a future value on the basis of the value of the financial asset from interceptors of the communication channel as well as administrators of calculation processing devices 40-1~N.

FIG. 7 is an exemplary action flow of a distributed computing system 10. Input means 300 allows a user to input an input parameter, which is at least one parameter including a linear parameter, by means of input station 20 (S700). Then parameter storage means 310 stores a set of an input parameter input by a user on input means 300 and predetermined other parameters as a parameter set in association with parameter identifying information for identifying the parameter (S705).

On the other hand, each information processing device in a group of information processing devices 45, for example calculation processing device 40-1, outputs calculation requesting device 30 calculation reserve capacity ratio indicating a ratio of calculation throughput, which should be performed in a certain unit time, to the maximum calculation throughput, which can be processed in a unit time (S710). In response, means to select an available device for calculation 320 selects a plurality of devices with calculation reserve capacity, which are information processing devices with calculation reserve capacity ratio under a reference ratio (S720). For example, means to select an available device for calculation 320 selects calculation processing devices 40-1~N as devices with calculation reserve capacity.

Selection processing of devices with calculation reserve capacity shown in S720 is not limited to processing by calculation requesting device 30. For example, an administrator of distributed computing system 10 may select an information processing device with calculation reserve capacity ratio under a reference ratio by asking users of respective information processing devices and set the device as parameter sending means 350 of calculation requesting device 30.

Conversion means 330 convert a linear parameter in the parameter into a conversion parameter to hide the linear parameter from calculation processing devices 40-1~N for each of a plurality of parameter sets stored in parameter storage means 310 (S730). Then, conversion ratio storage means 340 calculates a conversion ratio, which is a ratio of a conversion parameter to a linear parameter and stores the conversion ratio in association with parameter identifying information for each of a plurality of parameter sets (S740).

Parameter sending means 350 sends each of parameter sets converted by conversion means 330 to each of calculation processing devices 40-1~N in association with parameter identifying information for identifying the parameter set (S745). Then, parameter sending means 350 make each of a plurality of partial calculations to be performed in each of calculation processing devices 40-1~N.

Parameter sending means 350 can also send a plurality of parameter sets, each including a different initial value of random numbers, to a single calculation processing device, for example calculation processing device 40-1. In this case, parameter sending means 350 can make a plurality of partial calculations to be performed in calculation processing device 40-1. For example, calculation requesting device 30 can send 100 parameter sets, each including a different initial value of random numbers, to each of 100 calculation processing devices so as to generate a partial calculation result for each of 10000 initial values of random numbers.

When calculation means 400 in calculation processing device 40-1 receives a parameter set from calculation requesting device 30 (S750: YES), it performs a partial calculation in parallel with calculation processing devices 40-2~N on the basis of the parameter set (S760). Then, result sending means 410 sends a calculation result from calculation means 400 to calculation requesting device 30 in association with parameter identifying information (S770).

Now, an example of partial calculation will be described. Calculation means 400 receives financial asset information including each rating, the number and maturity date for the financial asset in each of a plurality of financial assets, correlation information indicating a correlation of price fluctuation among the plurality of financial assets, and an initial value of random numbers as a parameter set. Then, calculation means 400 converts a standard normal distribution, which is a predetermined probability distribution, into a correlation normal distribution indicating a probability model of price fluctuation in the plurality of financial assets on the basis of correlation information.

Calculation means 400 generates a random number generated according to the correlation normal distribution for each financial asset on the basis of the random number generated according to an initial value of random numbers. Then, calculation means 400 generates a predicted value for a future value of the financial asset on the basis of a random number corresponding to each of a plurality of financial assets. More specifically, when a financial asset is a bond, calculation means 400 may generate a predicted value for a future value of a financial asset further on the basis of a yield curve, which is defined according to rating information. For example, calculation means 400 can perform a calculation with Credit-Metrics (Registered Trademark) technology, which is a credit risk calculation.

An action flow in each of calculation processing devices 40-2~N is just about the same as that of calculation processing device 40-1. Thus, description about the action flow thereof will be omitted.

When calculation requesting device 30 receives a calculation result of a partial calculation from each of calculation processing devices 40-1~N (S780: YES), conversion ratio searching means 360 searches conversion ratio storage means 340 for a conversion ratio corresponding to parameter identifying information received from the calculation processing device and obtains the ratio from the means for each of calculation processing devices 40-1~N, a sender of a calculation result (S790).

Then, inversion outputting means 370 generates a partial calculation result by multiplying each of calculation results of partial calculations received from calculation processing devices 40-1~N by an inverse number of a conversion ratio corresponding to parameter identifying information received from each of calculation processing devices 40-1~N and outputs a financial risk on the basis of a set of the partial calculation results as a calculation processing result (S795).

For example, inversion outputting means 370 can calculate a financial risk of a portfolio on the basis of a predicted value for a future value of a financial asset, which is a partial calculation result. For example, each partial calculation result is calculated on the basis of each of input values of a plurality of random numbers, each being different. With the result of each partial calculation, inversion outputting means 370 can calculate a mean value, a dispersed value, a standard deviation value, a probability distribution, and a VaR (value at risk) value for a price fluctuation in a certain portfolio through Monte Carlo simulation on the basis of results of the plurality of partial calculation, each being different.

As shown in FIG. 7, according to distributed computing system 10, a user can perform a highly confidential calculation by making the best of a calculation resource in each of calculation processing devices 40-1~N. Each processing step shown in FIG. 7 is not limited to the processing performed by calculation requesting device 30 or calculation processing devices 40-1~N. The steps may be performed by an administrator or the like. For example, a distributed computing providing service, which is provided by an administrator of an Intranet manipulating each device of distributed computing system 10 to make a plurality of information processing devices connected to the Intranet serve as distributed computing system 10, also falls in the scope of the present invention.

FIG. 8(*a*) is an exemplary content of parameter set 600-1 according to a modification. FIG. 8(*b*) is an exemplary content of parameter set 600-2 according to a modification. The modification of conversion processing with conversion means 330 will be described with reference to the drawings. A function of each block and an action flow of the modification are just about the same as those of the embodiment described with reference to FIGS. 1 and 7. Thus, the difference between the modification and the embodiment will be described.

It is assumed that the content stored in parameter storage means 310 is just about the same as information shown in FIG. 2 in this modification. In other words, parameter storage means 310 stores the information that a financial asset whose financial asset information is 1 is 7,000,000 yen, a financial asset whose financial asset information is 2 is 1,000,000 yen, a financial asset whose financial asset information is 3 is 1,000,000 yen, a financial asset whose financial asset information is 4 is 3,000,000 yen, and a financial asset whose financial asset information is 5 is 10,000,000.

As shown in FIG. 8(*a*), conversion means 330 may convert a value of a financial asset, which is a linear parameter, into a conversion parameter, which is a random number whose number of digits is the same as that of a linear parameter. For example, conversion means 330 may convert 7,000,000 yen, the value of a financial asset whose asset identification information is 1, into 4,000,000 yen, the conversion parameter, which is a random number whose number of digits is the same as that of 7,000,000 yen.

Conversion means 330 may convert each of a plurality of linear parameters to be sent to the same calculation processing device into each of a plurality of conversion parameters whose sum is just about the same as that of the plurality of linear parameters. For example, conversion means 330 may convert each of the values of financial assets shown in FIG. 2 into a plurality of conversion parameters whose sum is just about the same as that of values of the financial assets, 22,000,000 yen, such as 4,000,000 yen, 2,000,000 yen, 3,000,000 yen, 2,000,000 yen, and 11,000,000 yen.

As this makes a sum of values of financial assets intercepted is just about the same as that of the actual financial asset, the interceptor or the like cannot tell whether the intercepted data is true or false. For example, if an owner of a portfolio is a company whose shares are listed on a stock exchange or the like, and it discloses the value of its total assets, it can properly hide a breakdown of the financial assets of the portfolio.

Moreover, when one linear parameter is different from the other linear parameters in a parameter set, conversion means 330 may convert these linear parameters into the same conversion parameter. For example, conversion means 330 may convert both 1,000,000 yen, the value of a financial asset whose financial identification information is 2, and 3,000,000 yen, the value of a financial asset whose financial identification information is 4, into 2,000,000 yen, the same conversion parameter.

Moreover, when one linear parameter is the same as the other linear parameters in a parameter set, conversion means 330 may convert each of these linear parameters into different conversion parameters. For example, conversion means 330 may convert 1,000,000 yen, the value of a financial asset whose financial identification information is 2, and 1,000,000 yen, the value of a financial asset whose financial identification information is 3, into 2,000,000 yen and 3,000,000 yen, respectively.

In this manner, information whether the owned number of a certain plurality of financial assets in a portfolio is the same or not can be properly hidden.

As it is shown in FIG. 8(b), conversion means 330 converts the number indicating a linear parameter in a financial asset whose financial identifying information is 1 into 4,000,000 yen, a conversion parameter in parameter set 600-1 as well as into 5,000,000 yen, a conversion parameter in parameter set 600-2. In this manner, conversion parameter 330 may convert a linear parameter of the parameter set into a conversion parameter, which varies according to an initial value of random numbers in the parameter set in each of a plurality of parameter sets.

As a result, an administrator of each of calculation processing devices 40-1~N receives a different portfolio for a different initial value of random numbers. Thus, each administrator cannot infer the object of the calculation or partial calculation. For example, an object of a calculation, for example generating a financial risk performed on the same portfolio with a plurality of initial values of random numbers can be hidden.

A value of a financial asset in each of parameter set 600-1 and parameter set 600-2 can be previously associated with the destined calculation processing devices of parameter set 600-1 and parameter set 600-2. In other words, conversion means 330 may convert a linear parameter of the parameter set into a conversion parameter that is a value previously associated with a calculation processing device, which is the destination of the parameter set, whatever a value of a linear parameter or an initial value of random numbers is, for each of the plurality of parameter sets.

As mentioned above, according to the modification, conversion means 330 can prevent an interceptor of the communication or the like from distinguishing a conversion parameter from a linear parameter.

FIG. 9 is an exemplary hardware configuration of calculation requesting device 30. Calculation requesting device 30 includes CPU peripheral units having CPU 1000, RAM 1020, graphic controller 1075, and display device 1080 connected each other via host controller 1082, input/output units having communication interface 1030, hard disk drive 1040, and CD-ROM drive 1060 connected to host controller 1082 via input/output controller 1084, and legacy input/output units having ROM 1010, flexible disk drive 1050, and input/output chip 1070 connected to input/output controller 1084.

Host controller 1082 connects RAM 1020 with CPU 1000 and graphic controller 1075 that access RAM 1020 at high transfer rate. CPU 1000 operates on the basis of a program stored in ROM 1010 and RAM 1020 and controls each unit. Graphic controller 1075 obtains image data to be generated on a frame buffer provided by CPU 1000 or the like in RAM 1020 and displays the image data on display device 1080. Graphic controller 1075 may incorporate a frame buffer to store image data generated by CPU 1000 or the like.

Input/output controller 1084 connects host controller 1082, communication interface 1030, which is a relatively fast input/output device, hard disk drive 1040, and CD-ROM drive 1060. Communication interface 1030 communicates with an external device such as input station 20 and a group of information processing devices 45 via a network. Hard disk drive 1040 stores a program or data used by calculation requesting device 30. CD-ROM drive 1060 reads out a program or data from CD-ROM 1095 and provides the program or data to input/output chip 1070 via RAM 1020.

Input/output controller 1084 is connected with ROM 1010 and a relatively slow input/output device such as flexible disc drive 1050 or input/output chip 1070. ROM 1010 stores a boot program executed by CPU 1000 at start-up of calculation requesting device 30, a program dependent on hardware of calculation requesting device 30, and the like. Flexible desk drive 1050 reads out a program or data from flexible disk 1090 and provides the program or data to input/output chip 1070 via RAM 1020. Input/output chip 1070 connects various input/output devices via flexible disk 1090 or, for example via a parallel port, s serial port, a keyboard port, a mouse port and the like.

A program provided to calculation requesting device 30 is supplied by a user on a recording medium such as flexible disk 1090, CD-ROM 1095, or IC card. The program is read out from the recording medium via input/output chip 1070 and/or input/output controller 1084 and installed on calculation requesting device 30 to be executed. A program provided to calculation requesting device 30 may be read out from a recording medium and installed on calculation processing devices 40-1~N via communication interface 1030 to be executed.

A program to be installed and executed on calculation requesting device 30 includes an input module, a parameter storage module, a device with calculation reserve capacity selection module, a conversion module, and inversion ratio outputting module. A program to be installed and executed on calculation processing devices 40-1~N includes a calculation module and a result sending module. Operations that respective modules cause calculation requesting device 30 and calculation processing devices 40-1~N to execute are the same as these of corresponding parts in calculation requesting device 30 and calculation processing devices 40-1~N described with reference to FIGS. 1 and 8. Thus, the description of the operations will be omitted.

Programs or modules described above may be stored in an external recording medium. As a recording medium, an optical recording medium such as a DVD or a PD, a magneto-optical recording medium such as an MD, a tape medium, semiconductor memory such as an IC card other than flexible disk 1090 and CD-ROM 1095 may be used. A recording device such as a hard disk or a RAM provided on a server system connected to a dedicated communication network or Internet may be used as a recording medium for providing a program via the network to calculation requesting device 30.

As is apparent from the above description, distributed computing system 10 converts a linear parameter, which is linear to a partial calculation result in a parameter set required for the partial calculation, into a conversion parameter. In this manner, distributed computing system 10 can properly hide a linear parameter from interceptors of a communication line and administrators of calculation processing devices 40-1~N and the like, while preventing a partial calculation result from being intercepted.

As distributed computing system 10 causes calculation processing devices 40-1~N to execute only the necessary partial calculations, the system 10 can more efficiently use calculation capacity of calculation processing devices 40-1~N than any conventional secret calculation technique does.

The method according to the embodiment can be applied to various calculations with a linear parameter. For example, distributed computing system 10 may calculate not only a calculation of a value of a portfolio but also a repayment amount or a loanable amount of a housing loan or an accumulated amount or a paid amount of a pension.

The present invention has been described with reference to embodiments, but the technical scope of the present invention is not limited to the scope of the above-mentioned embodiment. It is apparent to those skill in the art that various changes or modifications can be added to the above-mentioned embodiments. It is apparent from the appended Claim that such embodiments including those changes or modifications can fall in the technical scope of the present invention.

According to the above-mentioned embodiments, distributed computing system, a method for providing the same, a method and a program for controlling the same, and a recording medium described in items below can be implemented.

(Item 1) A distributed computing system comprising a plurality of calculation processing devices, each performing a plurality of partial calculations forming predetermined calculation processing, and a calculation requesting device for requesting a partial calculation from the plurality of calculation processing devices, wherein the calculation requesting device comprises: a parameter storage means for storing a plurality of parameter sets, each having a plurality of parameters including at least one parameter different from the parameters of the other sets; a conversion means for converting a linear parameter, which is linear to a partial calculation result obtained by using the parameter set among a plurality of parameters in the parameter set into a conversion parameter to hide the linear parameter from the plurality of calculation processing devices for each of the plurality of parameter sets; a sending means for sending each of the parameter sets converted by the conversion means to each of the plurality of calculation processing devices in association with parameter identifying information for identifying the parameter set; and a conversion ratio storage means for storing a conversion ratio, which is a ratio of the conversion parameter to the linear parameter, in association with parameter identifying information for identifying the parameter set for each of the plurality of parameter sets; wherein each of the plurality of calculation processing devices comprises: a calculation means for performing a partial calculation in parallel with the other calculation processing devices on the basis of a parameter set obtained from the calculation requesting device; and a result sending means for sending a calculation result from the calculation means to the calculation requesting device in association with the parameter identifying information for identifying the parameter set, and wherein the calculation requesting device further comprises: a conversion ratio searching means for searching the conversion ratio storage means for a conversion ratio corresponding to the parameter identifying information received from the calculation processing device and for obtaining the ratio from the means for each of the plurality of calculation processing devices; and an inversion outputting means for generating a partial calculation result by multiplying a calculation result received from each of the plurality of calculation processing devices by an inverse number of the conversion ratio corresponding to the parameter identifying information received from the calculation processing device and for outputting a set of the generated partial calculation results as the calculation processing result.

(Item 2) The distributed computing system according to item 1, wherein the calculation processing is processing to calculate a financial risk of the portfolio for the portfolio that includes a plurality of financial assets; the parameter storage means stores a plurality of parameter sets including financial asset information indicating a value of a financial asset included in the portfolio, the plurality of parameter sets having different initial values of random numbers; the conversion means converts a value of the financial asset in a form of the linear parameter into a conversion parameter indicating a certain value to hide the value from the plurality of calculation processing devices for each of the plurality of parameter sets; the calculation processing means calculates a predicted value for a future value when a financial asset is the certain value, as the partial calculation performed in parallel with other calculation processing devices; the inversion outputting means generates a predicted value for a future value on the basis of a value of a financial asset as a result of the partial calculation by multiplying a predicted value for a future value for the financial asset received from each of the plurality of calculation processing devices by an inverse number of a conversion ratio corresponding to parameter identifying information received from the calculation processing device and outputs the financial risk on the basis of a set of calculation results in each of the plurality of calculation processing devices as a result of the calculation processing.

(Item 3) The distributed computing system according to item 2, wherein the parameter storage means stores the financial asset information further including rating and maturity date of a financial asset included in the portfolio; the calculation means calculates a predicted value for a future value when a financial asset is the certain value, further on the basis of rating and maturity date of the financial asset; and the inversion outputting means outputs the financial risk on the basis of rating and maturity date of the financial asset as a result of the calculation processing.

(Item 4) The distributed computing system according to item 3, wherein the parameter storage means stores a plurality of parameter sets, each having the financial asset information in each of a plurality of different financial assets forming the portfolio, correlation information indicating a correlation of price fluctuation among the plurality of financial assets and the initial value of random numbers with at least the initial value of random numbers different from the initial values of random numbers of the other sets; the calculation means calculates a predicted value for a future value for each of financial assets forming the portfolio on the basis of random numbers generated according to the initial value of random numbers and the correlation information as the partial calculation performed in parallel with the other calculation processing devices.

(Item 5) The distributed computing system according to item 2, wherein the conversion means converts the number of the financial assets in a form of the linear parameter in the parameter set into the converted parameter that is the amount of a trading unit of the financial asset.

(Item 6) The distributed computing system according to item 2, wherein the conversion means converts a linear parameter of the parameter set into a conversion parameter that varies with the initial value of random numbers in the parameter set for each of the plurality of parameter set.

(Item 7) The distributed computing system according to item 1, wherein the conversion means converts the linear parameter in each of the plurality of parameter sets into a conversion parameter predefined to the same value.

(Item 8) The distributed computing system according to item 1, wherein the conversion means converts the linear parameter into a conversion parameter that is random numbers.

(Item 9) The distributed computing system according to item 8, wherein the conversion means converts the linear parameter into a conversion parameter that has the same number of digits as that of the linear parameter.

(Item 10) The distributed computing system according to item 1, wherein the parameter storage means stores a parameter set including a plurality of the linear parameters as each of the plurality of parameter sets; and the conversion means converts each of a plurality of linear parameters to be sent to the same calculation processing device into each of a plurality of conversion parameters that has just about the same sum as that of the plurality of linear parameters.

(Item 11) The distributed computing system according to item 1, wherein the parameter storage means stores a parameter set including a plurality of the linear parameters as each of the plurality of parameter sets; and the conversion means converts both of one of the linear parameters and another of the linear parameters into the same conversion parameter when the linear parameter is different from the another linear parameter in the parameter set.

(Item 12) The distributed computing system according to item 1, wherein the parameter storage means stores a parameter set including a plurality of the linear parameters as each of the plurality of parameter sets; and the conversion means converts each of one of the linear parameter and another of the linear parameter into different conversion parameters when the linear parameter is different from the another linear parameter in the parameter set.

(Item 13) The distributed computing system according to item 1, wherein the conversion means converts a linear parameter of the parameter set into a conversion parameter that is a value previously associated with a calculation processing device, which is the destination of the parameter set, for each of the plurality of parameter sets.

(Item 14) The distributed computing system according to item 1, wherein the distributed computing system is a calculation service system performing the calculation processing service in response to an input by a user; the calculation requesting device further comprises an input means for allowing the user to input an input parameter that is at least one parameter including the linear parameter in the parameter set; the parameter storage means stores the input parameter and predetermined other parameters as the parameter set; and the inversion outputting means outputs a result of the calculation processing to the user.

(Item 15) A calculation requesting device for causing each of a plurality of calculation processing devices to perform each of a plurality of partial calculations forming predetermined calculation processing, comprising: a parameter storage means for storing a plurality of parameter sets, each having a plurality of parameters including at least one parameter different from the parameters of the other sets; a conversion means for converting a linear parameter that is linear to a result of a partial calculation obtained by using the parameter set, among a plurality of parameters in the parameter set for each of the plurality of parameter sets; a sending means for causing each of the plurality of calculation processing devices to perform each of the plurality of partial calculations by sending each of the parameter sets converted by the conversion means to each of the plurality of calculation processing devices in association with parameter identifying information for identifying the parameter set; a conversion ratio storage means for storing a conversion ratio, which is a ratio of the conversion parameter to the linear parameter, in association with parameter identifying information for identifying the parameter set for each of the plurality of parameter sets; a conversion ratio searching means for searching the conversion ratio storage means for a conversion ratio corresponding to the parameter identifying information received from the calculation processing device and for obtaining the ratio from the means for each of the plurality of calculation processing devices; and an inversion outputting means for generating a partial calculation result by multiplying the calculation result received from each of the plurality of calculation processing devices by an inverse number of the conversion ratio corresponding to the parameter identifying information received from the calculation processing device and for outputting a set of the generated partial calculation results as a result of the calculation processing.

(Item 16) A distributed computing providing method for causing each of a plurality of calculation processing devices to perform each of a plurality of partial calculations forming predetermined calculation processing, comprising: a device with calculation reserve capacity selecting step of selecting a plurality of devices with calculation reserve capacity, each being an information processing device whose ratio of calculation throughput to be performed in a certain unit time to the maximum calculation throughput, which can be processed in a unit time, is lower than a predetermined standard; a parameter storing step of storing a plurality of parameter sets in a calculation requesting device that is predetermined one of the information processing devices, each of the plurality of parameter sets having a plurality of parameters including at least one parameter different from the parameters of the other sets; a conversion step of converting a linear parameter, which is linear to a partial calculation result obtained by using the parameter set, among a plurality of parameters in the parameter set into a conversion parameter to hide the linear parameter from the plurality of devices with calculation reserve capacity for each of the plurality of parameter sets in the calculation requesting device; a sending step of sending each of the parameter sets converted at the conversion step to each of the plurality of devices with calculation reserve capacity in association with parameter identifying information for identifying the parameter set in the calculation requesting device; and a conversion ratio storing step of storing a conversion ratio, which is a ratio of the conversion parameter to the linear parameter, in memory in association with parameter identifying information for identifying the parameter set for each of the plurality of parameter sets in the calculation requesting device; a calculation step of performing a partial calculation in parallel with the other devices with calculation reserve capacity on the basis of a parameter set obtained from the calculation requesting device in each of the plurality of devices with calculation reserve capacity; a conversion ratio searching step of searching the memory for a conversion ratio corresponding to the parameter identifying information received from the plurality of devices with calculation reserve capacity and for obtaining the ratio from the memory in the calculation requesting device; and an inversion outputting step of generating a partial calculation result by multiplying a calculation result received from each of the plurality of devices with calculation reserve capacity by an inverse number of the conversion ratio corresponding to the parameter identifying information received from the calculation processing device and for outputting a set of generated partial calculation results as a result of the calculation processing in the calculation requiring device.

(Item 17) A controlling method for controlling a distributed computing system comprising a plurality of calculating processing devices, each performs each of a plurality of partial calculations forming a predetermined calculation processing and a calculation requesting device for requesting a partial calculation from the plurality of calculation processing devices, wherein the calculation requesting device comprises: a parameter storing step of storing a plurality of parameter sets, each having a plurality of parameters including at least one parameter different from the parameters of the other sets; a converting step of converting a linear parameter, which is linear to a partial calculation result obtained by using the parameter set among a plurality of parameters in the parameter set into a conversion parameter to hide the linear parameter from the plurality of calculation processing devices for each of the plurality of parameter sets; a sending step of sending each of the parameter sets converted at the converting step to each of the plurality of calculation processing devices in association with parameter identifying information for identifying the parameter set; and a conversion ratio storing step of storing a conversion ratio, which is a ratio of the conversion parameter to the linear parameter, in association with parameter identifying information for identifying the parameter set for each of the plurality of parameter sets; wherein each of the plurality of calculation processing devices comprises: a calculating step of performing a partial calculation in parallel with the other calculation processing devices on the basis of a parameter set obtained from the calculation requesting device; and a result sending step of sending a calculation result obtained at the calculating step to the calculation requesting device in association with the parameter identifying information for identifying the parameter set, and wherein the calculation requesting device further comprises: a conversion ratio searching step of searching data stored at the conversion ratio storing step for a conversion ratio corresponding to the parameter identifying information received from the calculation processing device and of obtaining the ratio from the data for each of the plurality of calculation processing devices; and an inversion outputting step of generating a partial calculation result by multiplying a calculation result received from each of the plurality of calculation processing devices by an inverse number of the conversion ratio corresponding to the parameter identifying information received from the calculation processing device and of outputting a set of generated partial calculation results as a result of the calculation processing.

(Item 18) A controlling method for controlling a calculation requesting device that causes each of a plurality of calculation processing devices to perform each of a plurality of partial calculations forming predetermined calculation processing, comprising: a parameter storing step of storing a plurality of parameter sets, each having a plurality of parameters including at least one parameter different from the parameters of the other sets; a converting step of converting a linear parameter, which is linear to a partial calculation result obtained by using the parameter set among a plurality of parameters in the parameter set into a conversion parameter to hide the linear parameter from the plurality of calculation processing devices for each of the plurality of parameter sets; a sending step of sending each of the parameter sets converted at the converting step to each of the plurality of calculation processing devices in association with parameter identifying information for identifying the parameter set to cause each of the plurality of calculation processing devices to perform each of the plurality of partial calculations; and a conversion ratio storing step of storing a conversion ratio, which is a ratio of the conversion parameter to the linear parameter, in association with parameter identifying information for identifying the parameter set for each of the plurality of parameter sets; a conversion ratio searching step of searching data stored at the conversion ratio storing step for a conversion ratio corresponding to the parameter identifying information received from the calculation processing device and of obtaining the ratio from the data for each of the plurality of calculation processing devices; and an inversion outputting step of generating a partial calculation result by multiplying a calculation result received from each of the plurality of calculation processing devices by an inverse number of the conversion ratio corresponding to the parameter identifying information received from the calculation processing device and of outputting a set of generated partial calculation results as a result of the calculation processing.

(Item 19) A program for controlling a distributed computing system comprising a plurality of calculation processing devices, each performing a plurality of partial calculations forming predetermined calculation processing, and a calculation requesting device for requesting a partial calculation from the plurality of calculation processing devices, wherein the program causes the calculation requesting device to function as: a parameter storage means for storing a plurality of parameter sets, each having a plurality of parameters including at least one parameter different from the parameters of the other sets; a conversion means for converting a linear parameter, which is linear to a partial calculation result obtained by using the parameter set among a plurality of parameters in the parameter set into a conversion parameter to hide the linear parameter from the plurality of calculation processing devices for each of the plurality of parameter sets; a sending means for sending each of the parameter sets converted by the conversion means to each of the plurality of calculation processing devices in association with parameter identifying information for identifying the parameter set; and a conversion ratio storage means for storing a conversion ratio, which is a ratio of the conversion parameter to the linear parameter, in association with parameter identifying information for identifying the parameter set for each of the plurality of parameter sets; wherein the program causes each of the plurality of calculation processing devices to function as: a calculation means for performing a partial calculation in parallel with the other calculation processing devices on the basis of a parameter set obtained from the calculation requesting device; and a result sending means for sending a calculation result from the calculation means to the calculation requesting device in association with the parameter identifying information for identifying the parameter set, and wherein the program further causes the calculation requesting device to function as: a conversion ratio searching means for searching the conversion ratio storage means for a conversion ratio corresponding to the parameter identifying information received from the calculation processing device and for obtaining the ratio from the means for each of the plurality of calculation processing devices; and an inversion outputting means for generating a partial calculation result by multiplying a calculation result received from each of the plurality of calculation processing devices by an inverse number of the conversion ratio corresponding to the parameter identifying information received from the calculation processing device and for outputting a set of generated partial calculation results as a result of the calculation processing.

(Item 20) A program for controlling a calculation requesting device that causes each of a plurality of calculation processing devices to perform each of a plurality of partial calculations forming predetermined calculation processing, wherein the program causes the calculation requesting device to function as: a parameter storage means for storing a plurality of parameter sets, each having a plurality of parameters including at least one parameter different from the parameters of the other sets; a conversion means for converting a linear parameter, which is linear to a partial calculation result obtained by using the parameter set among a plurality of parameters in the parameter set into a conversion parameter to hide the linear parameter from the plurality of calculation processing devices for each of the plurality of parameter sets; a sending means for sending each of the parameter sets converted by the conversion means to each of the plurality of calculation processing devices in association with parameter identifying information for identifying the parameter set to cause each of the plurality of calculation processing devices to perform each of the plurality of partial calculations; and a conversion ratio storage means for storing a conversion ratio, which is a ratio of the conversion parameter to the linear parameter, in association with parameter identifying information for identifying the parameter set for each of the plurality of parameter sets; a conversion ratio searching means for searching the conversion ratio storage means for a conversion ratio corresponding to the parameter identifying information received from the calculation processing device and for obtaining the ratio from the means for each of the plurality of calculation processing devices; and an inversion outputting means for generating a partial calculation result by multiplying a calculation result received from each of the plurality of calculation processing devices by an inverse number of the conversion ratio corresponding to the parameter identifying information received from the calculation processing device and for outputting a set of generated partial calculation results as a result of the calculation processing.

(Item 21) A recording medium storing a program according to item 19 or 20.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A distributed computing system comprising a plurality of calculation processing devices, each performing a plurality of partial calculations forming predetermined calculation processing, and a calculation requesting device for requesting a partial calculation from said plurality of calculation processing devices, wherein said calculation requesting device comprises:

a parameter storage means for storing a plurality of parameter sets, each of the parameter sets having a plurality of parameters, and each of the parameter sets including at least one parameter different from the parameters of the parameters of the parameter sets other than said each of the parameter sets;

a conversion means for converting a linear parameter, which is linear to a partial calculation result obtained by using the parameter set among a plurality of parameters in the parameter set into a conversion parameter to hide said linear parameter from said plurality of calculation processing devices for each of said plurality of parameter sets;

a sending means for sending each of said parameter sets convened by said conversion means to each of said plurality of calculation processing devices in association with parameter identifying information for identifying the parameter set; and a conversion ratio storage means for storing a conversion ratio, which is a ratio of said conversion parameter to said linear parameter, in association with parameter identifying information for identifying the parameter set for each of said plurality of parameter sets;

wherein each of said plurality of calculation processing devices comprises:

a calculation means for performing a partial calculation in parallel with the other calculation processing devices other than said each of the calculation processing devices, on the basis of a parameter set obtained from said calculation requesting device; and a result sending means for sending a calculation result from said calculation means to said calculation requesting device in association with said parameter identifying information for identifying the parameter set, wherein said calculation requesting device further comprises:

a conversion ratio searching means for searching said conversion ratio storage means for a conversion ratio corresponding to said parameter identifying information received from the calculation processing device and for obtaining said ratio from said means for each of said plurality of calculation processing devices; and an inversion outputting means for generating a partial calculation result by multiplying a calculation result received from each of said plurality of calculation processing devices by an inverse number of the conversion ratio corresponding to said parameter identifying information received from the calculation processing device and for outputting a set of said generated partial calculation results as said calculation processing result;

said calculation processing is processing to calculate a financial risk of the portfolio for the portfolio that includes a plurality of financial assets;

said parameter storage means stores a plurality of parameter sets including financial asset information indicating a value of a financial asset included in the portfolio, said plurality of parameter sets having different initial values of random numbers;

said conversion means sends a parameter set including the conversion parameter to a parameter sending means in association with parameter identifying information, and the conversion means sends a linear parameter before conversion and conversion parameter after conversion to the conversion ratio storage means in association with parameter identifying information;

said conversion means converts a value of the financial asset in a form of said linear parameter into a conversion parameter indicating a certain value to hide said value from said plurality of calculation processing devices for each of said plurality of parameter sets;

said calculation processing devices calculates a predicted value for a future value when a financial asset is said certain value, as said partial calculation performed in parallel with other calculation processing devices;

said inversion outputting means generates a predicted value for a future value on the basis of a value of a financial asset as a result of said partial calculation by multiplying a predicted value for a future value for said financial asset received from each of said plurality of calculation processing devices by an inverse number of a conversion ratio corresponding to parameter identifying information received from the calculation processing device and outputs said financial risk on the basis of a set of calculation results in each of said plurality of calculation processing devices as a result of said calculation processing;

said parameter storage means stores said financial asset information further including rating and maturity date of a financial asset included in the portfolio;

said calculation means calculates a predicted value for a future value when a financial asset is said certain value, further on the basis of rating and maturity date of the financial asset;

said inversion outputting means outputs said financial risk on the basis of rating and maturity date of the financial asset as a result of said calculation processing;

of the parameter sets, each having said financial asset information in each of a plurality of different financial assets forming said portfolio, correlation information indicating a correlation of price fluctuation among said plurality of financial assets and said initial value of random numbers with at least said initial value of random numbers in each of the parameter sets different from the initial values of random numbers of the parameter sets other than said each of the parameter sets;

said calculation means calculates a predicted value for a future value for each of financial assets forming said portfolio on the basis of random numbers generated according to said initial value of random numbers and said correlation information as said partial calculation performed in parallel with the other calculation processing devices;

said conversion means converts the number of said financial assets in a form of said linear parameter in the parameter set into said converted parameter that is the amount of a trading unit of the financial asset;

said distributed computing system is a calculation service system performing said calculation processing service in response to an input by a user;

said calculation requesting device further comprises an input means for allowing said user to input an input parameter that is at least one parameter including said linear parameter in said parameter set;

said parameter storage means stores said input parameter and predetermined other parameters as said parameter set; and said inversion outputting means outputs a result of said calculation processing to said user.

* * * * *